US008602179B2

(12) United States Patent
Lee

(10) Patent No.: US 8,602,179 B2
(45) Date of Patent: Dec. 10, 2013

(54) DISC ROTOR UNIT FOR VEHICLE

(75) Inventor: Chel Won Lee, Wanju-gun (KR)

(73) Assignee: Hyundai Motor Company, Seoul (KR)

( * ) Notice: Subject to any disclaimer, the term of this patent is extended or adjusted under 35 U.S.C. 154(b) by 59 days.

(21) Appl. No.: 13/230,459

(22) Filed: Sep. 12, 2011

(65) Prior Publication Data

US 2012/0067679 A1 Mar. 22, 2012

(30) Foreign Application Priority Data

Sep. 17, 2010 (KR) ........................ 10-2010-0092060

(51) Int. Cl.
*F16D 65/12* (2006.01)

(52) U.S. Cl.
USPC .................................................... 188/218 XL

(58) Field of Classification Search
USPC ......... 188/17, 18 A, 218 XL, 264 A, 264 AA
See application file for complete search history.

(56) References Cited

U.S. PATENT DOCUMENTS

2003/0066715 A1 4/2003 Baumgartner et al.
2008/0128229 A1* 6/2008 Pahle ...................... 188/218 XL
2009/0218183 A1* 9/2009 Burgoon et al. ........ 188/218 XL
2009/0260933 A1* 10/2009 Pahle ...................... 188/218 XL
2010/0084231 A1* 4/2010 Biondo et al. .......... 188/218 XL

FOREIGN PATENT DOCUMENTS

DE 10 2004 034 121 A1 2/2006
JP 2002-005207 A 1/2002
JP 2002-5207 A 1/2002
JP 2006-37993 A 2/2006
JP 2010-106916 A 5/2010
JP 2010-106917 A 5/2010
WO WO 93/24761 A1 12/1993

* cited by examiner

*Primary Examiner* — Christopher Schwartz
(74) *Attorney, Agent, or Firm* — Morgan, Lewis & Bockius LLP

(57) ABSTRACT

A disk rotor unit for a vehicle includes an adapter portion of which an end portion may be connected to a wheel hub, wherein a plurality of cam protrusions may be formed to an exterior circumference of the other end portion of the adapter portion, a disk portion of which a plurality of support protrusions corresponding to the cam protrusions may be formed to an interior circumference thereof, wherein each support protrusion may be inserted between adjacent cam protrusions for assembling the disk portion with the adapter portion, and an assemble member engaged with the other end portion of the adapter portion for assembling the disk portion to the adapter portion.

6 Claims, 5 Drawing Sheets

100 123 125 120 110 113 111 121 130 140 127 N 129

120
125
129
121
127
110
111
129

DISC ROTOR UNIT FOR VEHICLE

CROSS-REFERENCE TO RELATED APPLICATION

The present application claims priority to Korean Patent Application No. 10-2010-0092060 filed in the Korean Intellectual Property Office on Sep. 17, 2010, the entire contents of which is incorporated herein for all purposes by this reference.

BACKGROUND OF THE INVENTION

1. Field of the Invention

The present invention relates to a disk rotor unit for a vehicle. More particularly, the present invention relates to a disk rotor unit for a vehicle which may prevent heat-crack of a disk portion according to braking heat in braking of a vehicle.

2. Description of Related Art

Generally, a vehicle is equipped with a brake for reducing speed of the vehicle, and the brake generally is divided into a drum type brake and a disk type brake according to types of its rotating body.

The disk type brake uses pads which push both surfaces of a disk rotating with a wheel of a vehicle using hydraulic pressure, and the disk is integrally formed with an adapter mounted to a wheel hub, and it is also known as a disk rotor.

That is, in a conventional art, as shown in FIG. 5, a disk rotor 1 includes an adapter 3 equipped to a non-illustrated wheel hub and rotating with a wheel and a disk 5 integrally formed with the adapter 3 at an end of the adapter 3.

A caliper 7 is disposed to an exterior circumference of the disk 5, and brake pads (not shown), generating braking force by pressuring both side of the disk 7 according to manipulating of a brake pedal, are disposed within the caliper 7.

The disk rotor 1 rotates at a high speed and is applied with centrifugal force in driving, and is supplied high temperature due to friction with pads in braking, and thus heat energy may induce thermal deformation of the disk 5.

However, the adapter 3 and the disk 5 of the disk rotor 1 are integrally formed, and thus the adapter 3 restrains the disk 5 during thermal deformation so that disk 5 is deformed toward axial direction of the wheel hub not rotating direction. And thus heat-crack is created on surfaces of the disk 5.

The generated heat-crack on the surfaces of the disk 5 induces breaking the disk 5, durability of the disk rotor 1 is deteriorated, and thus replacement of the whole disk rotor 1. That is, merchantable quality of the disk rotor 1 is deteriorated, and additional cost for replacement of the disk rotor 1 is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a disk rotor unit for a vehicle which may prevent heat-crack of a disk portion according to braking heat in braking of a vehicle by inducing deformation of the disk toward a circumferential direction and improve durability.

A disk rotor unit for a vehicle may include an adapter portion of which an end portion may be connected to a wheel hub, wherein a plurality of cam protrusions may be formed to an exterior circumference of the other end portion of the adapter portion, a disk portion of which a plurality of support protrusions corresponding to the cam protrusions may be formed to an interior circumference thereof, wherein each support protrusion may be inserted between adjacent cam protrusions for assembling the disk portion with the adapter portion, and an assemble member engaged with the other end portion of the adapter portion for assembling the disk portion to the adapter portion.

The cam protrusions may be formed apart from each other at an interval along the exterior circumference of the other end portion of the adapter portion and protruded outwards.

The disk rotor unit further may include a stepped portion which may be protruded outwards from an outer surface of each cam protrusion corresponding to the disk portion.

The support protrusions may be formed apart from each other at an interval corresponding to the cam protrusions along the interior circumference of the disk portion and protruded inwards.

The disk portion may be formed by connecting an inner disk and an outer disk, and the support protrusions may be formed as a pair corresponding to the inner and outer disks.

The disk rotor unit further may include a stopper which may be protruded inwards from the interior circumference of the disk portion between adjacent support protrusions corresponding to the stepped portion.

The disk rotor unit further may include a washer which may be interposed between the assemble member and the disk portion, and a stopper which may be protruded inwards from the interior circumference of the disk portion between adjacent support protrusions corresponding to the stepped portion and the washer for the stepped portion and the washer to be caught thereto.

The assembly member may be a nut.

The adapter portion further may include a thread portion which may be formed to the exterior circumference of the other end portion in the adapter portion for the assemble nut to be engaged thereto.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
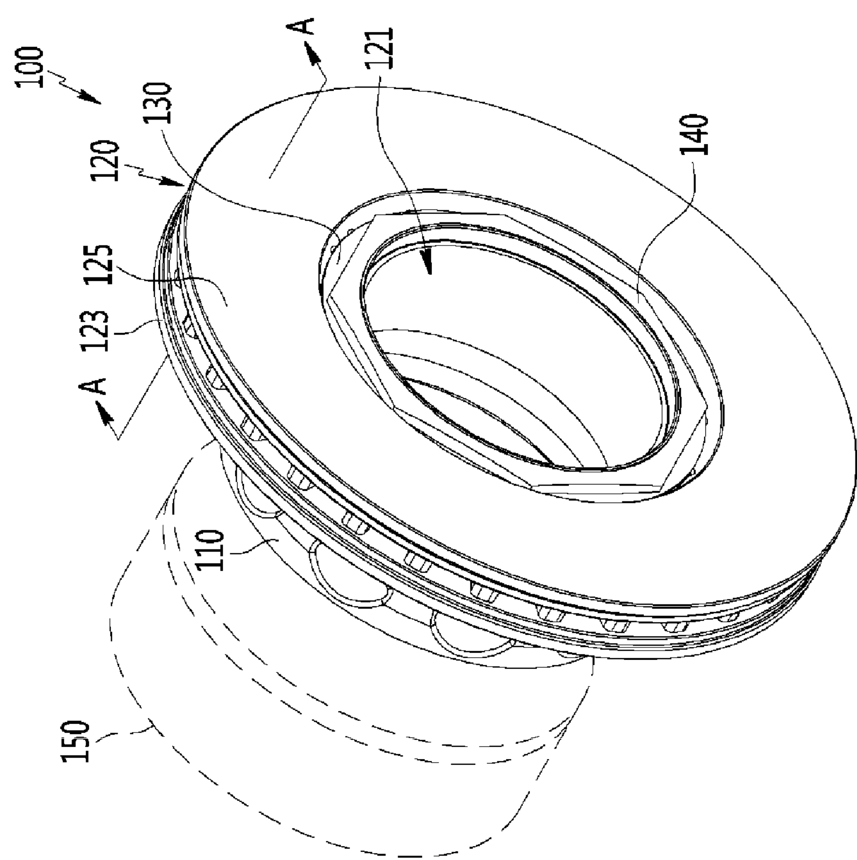
FIG. 1 is a perspective view showing a disk rotor unit for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

An exemplary embodiment of the present invention will hereinafter be described in detail with reference to the accompanying drawings.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
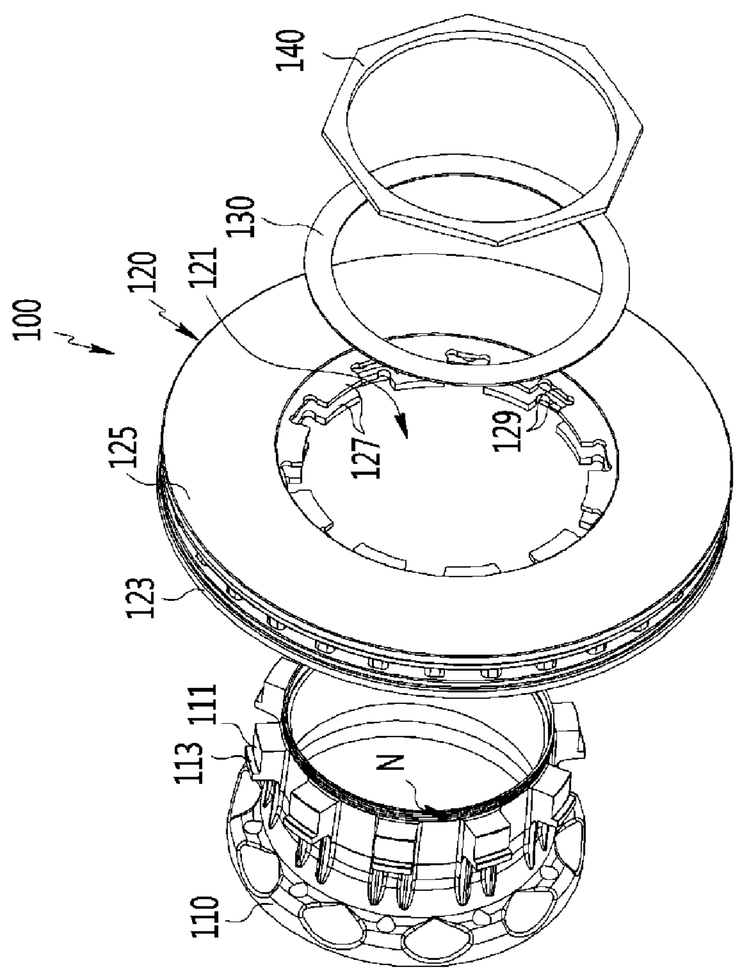
FIG. 2 is an exploded perspective view of a disk rotor unit for a vehicle according to an exemplary embodiment of the present invention.
Figure 3:
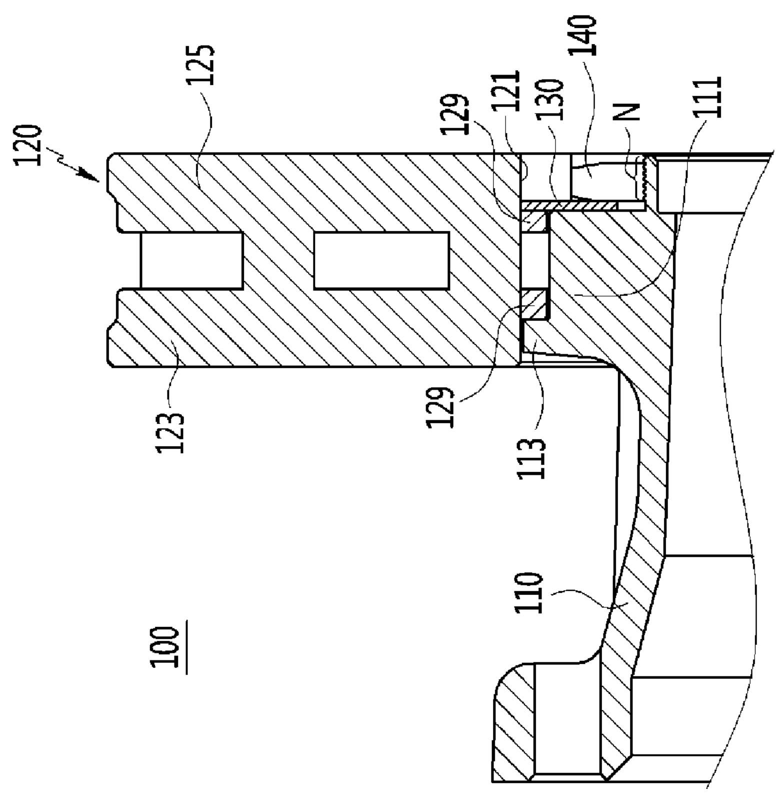
FIG. 3 is a cross-sectional view along line A-A of FIG. 1.
Figure 4:
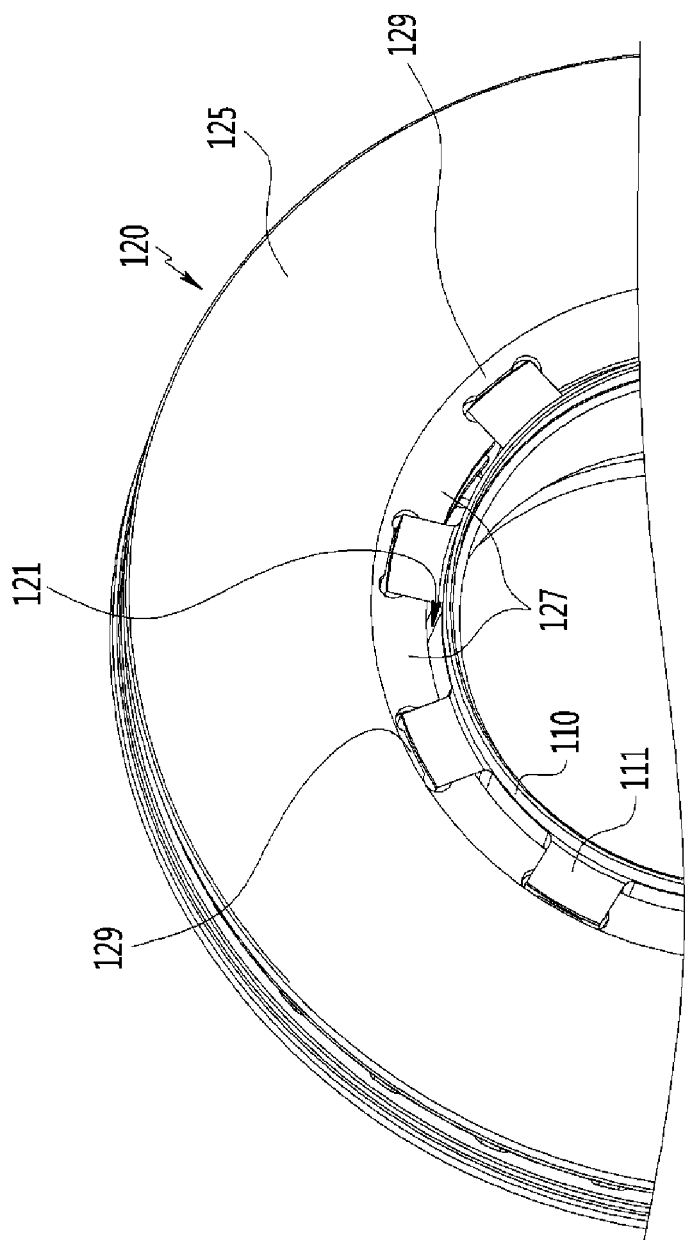
FIG. 4 is a drawing showing assembling of an adapter portion and a disk rotor of a disk rotor unit according to an exemplary embodiment of the present invention.
Figure 5:
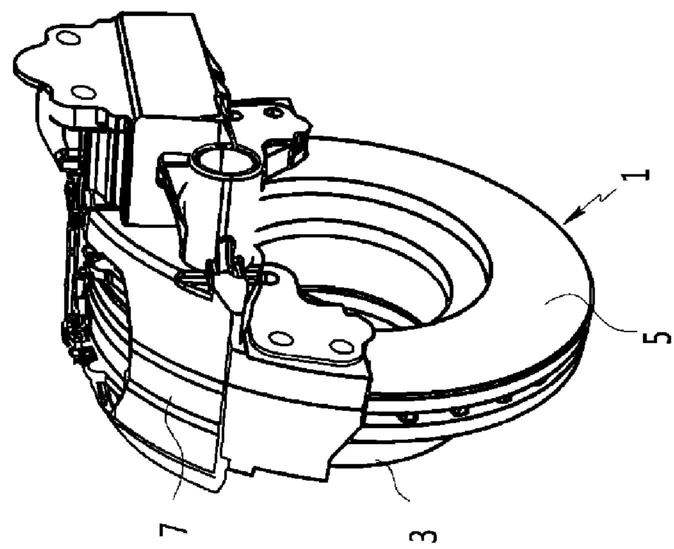
FIG. 5 is a perspective view of a conventional disk rotor for a vehicle.

FIG. 1 and FIG. 2 are respectively a perspective view and an exploded perspective view showing a disk rotor unit for a vehicle according to an exemplary embodiment of the present invention, FIG. 3 is a cross-sectional view along line A-A of FIG. 1, and FIG. 4 is a drawing showing assembling of a adapter portion and a disk rotor of a disk rotor unit according to an exemplary embodiment of the present invention.

Referring to the drawings, a disk rotor unit 100 for a vehicle according to an exemplary embodiment of the present invention includes an adapter portion 110 equipped to a wheel hub 150 and a disk portion 120 selectively contacting a brake pad which is assembled to the adapter portion 110. And thus the disk rotor unit 100 may prevent heat-crack of the disk portion 120 according to braking heat in braking of a vehicle by inducing deformation of the disk portion 120 toward a circumferential direction thereof and improve durability.

The disk rotor unit 100, as shown in FIG. 1 and FIG. 2, includes the adapter portion 110, the disk portion 120 and an assemble nut 140, and the detailed description of the element will be described hereinafter.

An end portion of the adapter portion 110 is connected to the wheel hub 150, and a plurality of cam protrusions 111 are formed to an exterior circumference of the other end portion of the adapter portion 110.

The cam protrusions 111 may be protruded apart from each other at an interval along the exterior circumference of the other end portion of the adapter portion 110.

The disk portion 120 is formed by assembling an inner disk 123 and an outer disk 125, and a penetration hole 121 is formed inside of the disk portion 120. A plurality of support protrusions 127, corresponding to the cam protrusions 111, are formed to an interior circumference of the penetration hole 121 and the support protrusions 127 are inserted between each cam protrusions 111 for assembling the disk portion 120 with the adapter portion 110.

The support protrusions 127 are protruded apart from each other at an interval corresponding to the cam protrusions 111 along the interior circumference of the penetration hole 121.

The support protrusions 127 are formed as a pair corresponding to the inner and outer disk 123 and 125.

In the present exemplary embodiment, the cam protrusions 111 and the support protrusions 127 are disposed apart from each other at an interval as 36° around center of the adapter portion 110 and the disk portion 120, that is, ten of the cam protrusions 111 and the support protrusions 127 are formed, but it is not limited to the drawing, but also various alternatives, modifications, equivalents and other embodiments, for example, various numbers and positions thereof may also possible.

The assemble nut 140 is engaged to the other portion of the adapter portion 110, which is connected to the disk portion 120 and a washer 130 is interposed between the disk portion 120 and the assemble nut 140.

A thread portion N is formed to the exterior circumference of the adapter portion 110 for the assemble nut 140 to be engaged thereto.

A stepped portion 113 is protruded from an outer surface of the cam protrusion 111 corresponding to the inner disk 123.

A stopper 129 is protruded between the support protrusions 127 corresponding to the stepped portion 113 and the washer 130 for the stepped portion 113 and the washer 130 to be caught thereto.

The stopper 129 may be formed as a pair corresponding to the inner/outer disk 123 and 125 and the support protrusions 127.

The stepped portion 113 formed to the cam protrusions 111 and the stopper 129 formed between the support protrusions 127, as shown in FIG. 3 and FIG. 4, prevent separation the adapter portion 110 from the disk portion 120 in assembling of the adapter portion 110 and the disk portion 120.

As described above, according to the exemplary embodiment of the present invention, since the adapter portion 110 mounted to the wheel hub 150 and the disk portion 120 contacting the brake pad are separated and assembled each other, and thus the disk rotor unit 100 may prevent heat-crack of the disk portion 120 according to braking heat in braking of a vehicle by inducing deformation of the disk portion 120 toward a circumferential direction and improve durability.

Also, enhanced durability of the disk portion 120 may improve field serve quality and reduce consumer complaints, and thus goods and competitiveness may be enhanced.

For convenience in explanation and accurate definition in the appended claims, the terms "inner", "outer", "interior" and "exterior" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A disk rotor unit for a vehicle comprising:

an adapter portion of which an end portion is connected to a wheel hub, wherein a plurality of cam protrusions are formed to an exterior circumference of the other end portion of the adapter portion;

a disk portion of which a plurality of support protrusions corresponding to the cam protrusions are formed to an interior circumference thereof, wherein each support protrusion is inserted between adjacent cam protrusions for assembling the disk portion with the adapter portion; and an assemble member engaged with the other end portion of the adapter portion for assembling the disk portion to the adapter portion, wherein the cam protrusions are formed apart from each other at an interval along the exterior circumference of the other end portion of the adapter portion and protruded outwards, wherein the disk rotor unit further includes a stepped portion which is protruded outwards from an outer surface of each cam protrusion corresponding to the disk portion, and wherein the disk rotor unit further includes a stopper which is protruded inwards from the interior circumference of the disk portion between adjacent support protrusions corresponding to the stepped portion.

2. The disk rotor unit of claim 1, wherein the disk rotor unit further includes:

a washer which is interposed between the assemble member and the disk portion; and a stopper which is protruded inwards from the interior circumference of the disk portion between adjacent support protrusions corresponding to the stepped portion and the washer for the stepped portion and the washer to be caught thereto.

3. The disk rotor unit of claim 2, wherein the assembly member is a nut.

4. The disk rotor unit of claim 3, wherein the adapter portion further includes a thread portion which is formed to the exterior circumference of the other end portion in the adapter portion for the assemble nut to be engaged thereto.

5. The disk rotor unit of claim 1, wherein the support protrusions are formed apart from each other at an interval corresponding to the cam protrusions along the interior circumference of the disk portion and protruded inwards.

6. The disk rotor unit of claim 1, wherein:

the disk portion is formed by connecting an inner disk and an outer disk; and the support protrusions are formed as a pair corresponding to the inner and outer disks.

* * * * *